(12) United States Patent
Samejima

(10) Patent No.: US 8,634,214 B2
(45) Date of Patent: Jan. 21, 2014

(54) CURRENT RESONANCE POWER SUPPLY WITH AC INPUT DETECTION INTO THE PRIMARY WINDING

(75) Inventor: Keisuke Samejima, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 304 days.

(21) Appl. No.: 13/109,792

(22) Filed: May 17, 2011

(65) Prior Publication Data

US 2011/0293313 A1 Dec. 1, 2011

(30) Foreign Application Priority Data

May 31, 2010 (JP) .................................. 2010-125239

(51) Int. Cl.
*H02M 3/335* (2006.01)
*H02M 7/537* (2006.01)

(52) U.S. Cl.
USPC .............. 363/24; 363/21.02; 363/25; 363/26; 363/131; 363/133; 363/134

(58) Field of Classification Search
USPC ............. 363/21.02, 24, 25, 26, 131, 133, 134
See application file for complete search history.

(56) References Cited

U.S. PATENT DOCUMENTS

| | | | | |
|---|---|---|---|---|
| 6,018,467 A | * | 1/2000 | Majid et al. ...................... | 363/16 |
| 6,400,584 B1 | * | 6/2002 | Sabate et al. .................... | 363/22 |
| 6,424,101 B1 | * | 7/2002 | Sabate .......................... | 315/307 |
| 6,934,167 B2 | * | 8/2005 | Jang et al. .................. | 363/21.02 |
| 7,272,019 B2 | * | 9/2007 | Nakagawa ....................... | 363/16 |
| 7,313,004 B1 | * | 12/2007 | Yang et al. ................. | 363/21.02 |
| 2002/0118553 A1 | * | 8/2002 | Morita ............................ | 363/25 |
| 2002/0176263 A1 | * | 11/2002 | Riggio et al. ................... | 363/24 |
| 2004/0218406 A1 | * | 11/2004 | Jang et al. ....................... | 363/37 |

FOREIGN PATENT DOCUMENTS

| | | |
|---|---|---|
| CN | 1519690 A | 8/2004 |
| CN | 1885704 A1 | 12/2006 |
| CN | 1950997 A | 4/2007 |
| JP | 07-274499 A | 10/1995 |
| JP | 2007-006614 A | 1/2007 |

* cited by examiner

*Primary Examiner* — Bao Q Vu

(74) *Attorney, Agent, or Firm* — Canon U.S.A., Inc. IP Division

(57) ABSTRACT

A current resonance power supply includes a transformer having a primary winding and a secondary winding, two switching elements connected to one end of the primary winding of the transformer and arranged in series, a resonance capacitor connected to the other end of the primary winding, and a voltage detection unit connected between the one end of the primary winding and the two switching elements and configured to detect that AC voltage input to a primary side of the transformer becomes lower, wherein operations of the switching elements are controlled based on a detection result of the voltage detection unit.

19 Claims, 11 Drawing Sheets

DRAIN CURRENT OF FET 106

ORDER 1, 7    ORDER 4

ORDER 2, 3    ORDER 5, 6

DRAIN CURRENT OF FET 107

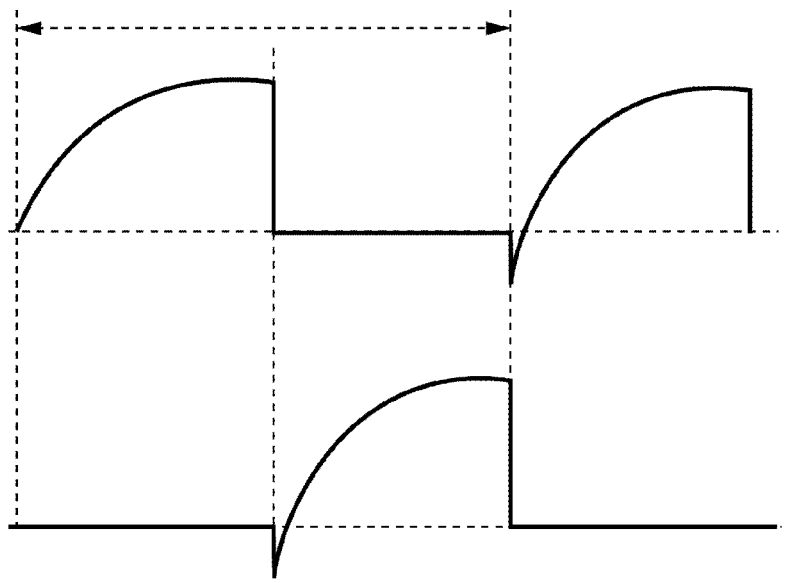

CURRENT RESONANCE POWER SUPPLY WITH AC INPUT DETECTION INTO THE PRIMARY WINDING

BACKGROUND OF THE INVENTION

1. Field of the Invention

The present invention relates to a power supply apparatus of a current resonance type.

2. Description of the Related Art

A switching power supply of a current resonance type is one example of a power supply apparatus that switches a voltage acquired by rectifying and smoothing an alternating-current voltage (hereinafter, AC input voltage) input from a commercial power supply by means of switching elements, and outputs a stable direct-current (DC) voltage via an insulating transformer.

In this switching power supply of the current resonance type, generally, a low-voltage detection circuit is added to detect a reduction in AC voltage input from the commercial power supply. The low-voltage detection circuit is provided primarily for the following two purposes.

The first purpose is to protect elements such as a field-effect transistor (FET) serving as a switching element, the transformer, and a capacitor for current resonance from an overcurrent state. As the AC voltage input from the commercial power supply becomes lower, to maintain a constant output from a secondary side of the transformer, the switching power supply operates so that an on-period of the FET can be longer. This creates a possibility that a current will become higher on a primary side of the transformer, setting the primary side in an overcurrent state. When the primary side of the transformer is set in the overcurrent state, circuit components including the FET of the primary side exceed a rating (breakdown strength) and are destroyed. Therefore, the circuit components of the primary side must be protected by detecting the overcurrent state to stop the operation.

The second purpose is to prevent a through-current flowing through two FETs that are switching elements. The through-current is generated when the AC input voltage drops, and the on-period of the FET is extended to maintain the constant output from the secondary side of the transformer. When on-period of the FET is long, after the FET is turned off, a reverse recovery current of the FET that has been turned off is generated, causing a through-current to flow.

As a low-voltage detection method in the switching power supply of the current resonance type, a method for detecting a divided voltage by a power supply control integrated circuit (IC) is employed. The divided voltage is acquired by dividing a voltage after rectifying and smoothing the AC input voltage from the commercial power supply (as discussed in Japanese Patent Application Laid-Open No. 2007-006614).

However, in the low-voltage detection method in the conventional switching power supply, to detect a low voltage, a voltage divider resistor is used for dividing and detecting the voltage after rectifying and smoothing the AC input voltage. This voltage divider resistor consumes power as a combined resistor, and uses a +terminal of a primary smoothing capacitor for rectifying and smoothing as a voltage source, both in a stop state and in a normal operation state of the power supply. Nowadays, power saving has become important for electronic devices, and power saving is also required of the switching power supply. Particularly, in the stop state, further power saving is required. In the abovementioned configuration of the conventional low-voltage detection circuit, power saving is difficult to be achieved because power is consumed by the voltage divider resistor.

SUMMARY OF THE INVENTION

It is desirable to provide a switching power supply of a current resonance type in which power saving is achieved.

According to an aspect of the present invention, a current resonance power supply includes a transformer having a primary winding and a secondary winding, two switching elements connected to one end of the primary winding of the transformer and arranged in series, a resonance capacitor connected to the other end of the primary winding, and a voltage detection unit connected between the one end of the primary winding and the two switching elements and configured to detect that AC voltage input to a primary side of the transformer becomes lower, wherein operations of the switching elements are controlled based on a detection result of the voltage detection unit.

According to another aspect of the present invention, an image forming apparatus includes an image forming means configured to form an image on an image carrier, a control means configured to control an image forming operation of the image forming means, and a power supply configured to supply power to the image forming means or the control means. The power supply is a current resonance power supply for resonating and includes a transformer having a primary winding and a secondary winding, two switching elements connected to one end of the primary winding of the transformer and arranged in series, a resonance capacitor connected to the other end of the primary winding, and a voltage detection unit connected between the one end of the primary winding and the two switching elements and configured to detect that AC voltage input to a primary side of the transformer becomes lower, and operations of the two switching elements are controlled based on a detection result of the voltage detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 10A and 10B schematically illustrate drain currents of the FET when the through-current is reduced.

DESCRIPTION OF THE EMBODIMENTS

Various exemplary embodiments, features, and aspects of the invention will be described in detail below with reference to the drawings.

Figure 1:
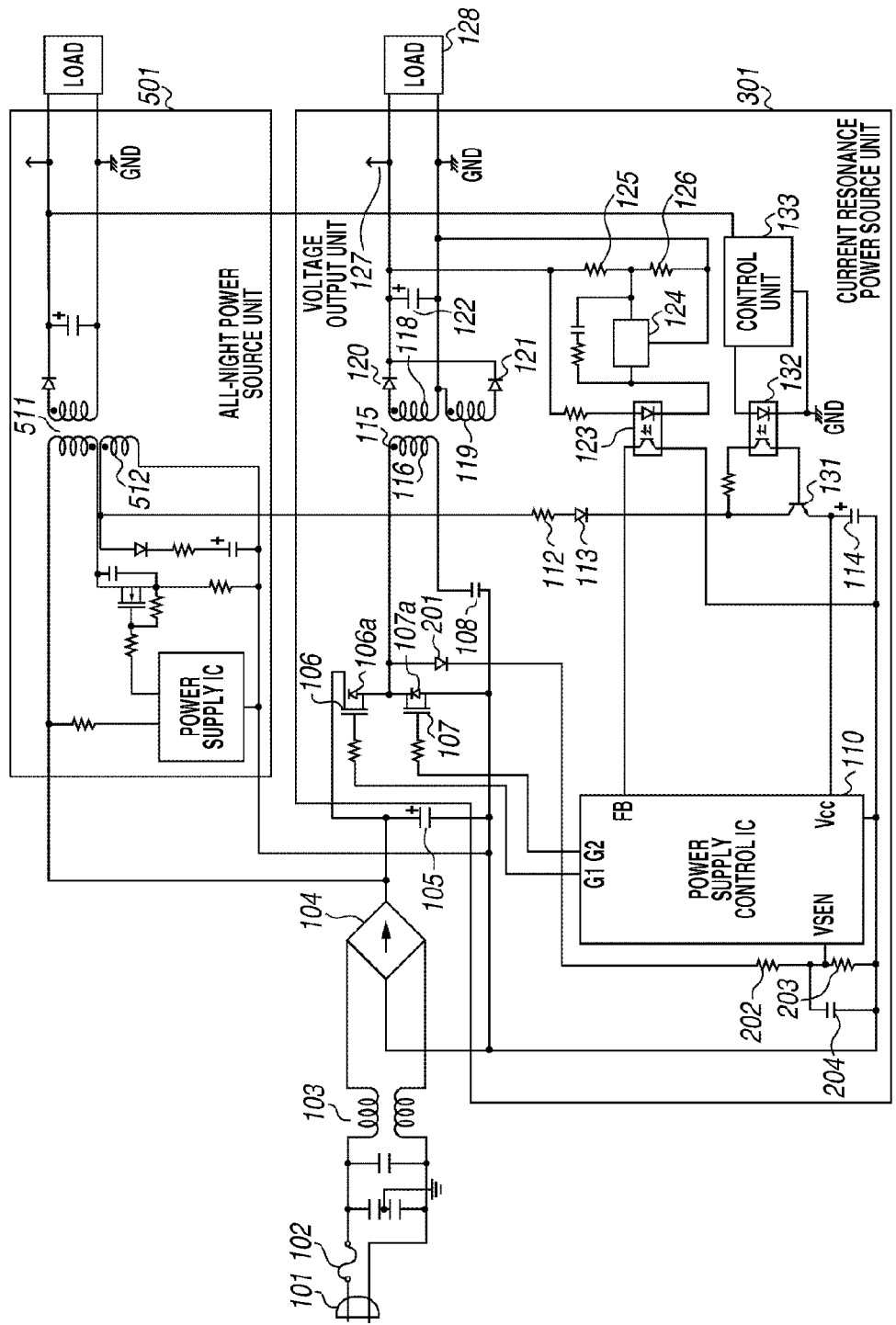
FIG. 1 is a circuit diagram illustrating a current resonance power supply according to a first exemplary embodiment.

First, a first exemplary embodiment is described. FIG. 1 is a circuit diagram illustrating a switching power supply of a current resonance type (hereinafter, current resonance power supply) according to the present exemplary embodiment. As illustrated, the current resonance power supply includes an inlet 101, a fuse 102, a common mode coil 103, a rectifying diode bridge 104, a primary smoothing capacitor 105, FETs 106 and 107 serving as switching elements, a capacitor 108 for current resonance, a power supply control IC 110, a resistor 112, a diode 113, a capacitor 114, a transformer 115, a primary winding 116 of the transformer 115, secondary windings 118 and 119 of the transformer 115, rectifying diodes 120 and 121, a smoothing capacitor 122, a photocoupler 123, a shunt regulator 124, regulation resistors 125 and 126, a voltage output unit (terminal) 127, a load 128 connected to the power supply, resistors 202 and 203 used for a low-voltage detection circuit, a transistor 131 serving as a switch for supplying power to the power supply control IC 110, a photocoupler 132 for controlling the transistor 131, a current resonance power supply 301, a control unit 133 for driving and stopping the current resonance power supply 301, and an all-night power supply (schematic circuit diagram of main portion) 501.

In a normal operation state of the current resonance power supply, the current resonance power supply 301 and the all-night power supply 501 both operate. In a power saving state, the control unit 133 stops supplying power to the power supply control IC of the current resonance power supply 301 to stop the operation of the current resonance power supply 301 but the all-night power supply 501 remains operational. Each of power supplies 301 and 501 is a switching power supply (converter) and accordingly this power supply can be described as a power supply device of a two-converter type.

Next, the operation of the current resonance power supply 301 is described. The power supply control IC 110 controls an on-period and an off-period of a control signal supplied to a gate terminal of each of the FET 106 and the FET 107 so that a DC current output from the voltage output unit 127 can be constant. The positive and negative outputs of the diode bridge 104 are connected to positive and negative supply lines of the primary-side circuitry. The primary smoothing capacitor is connected between the positive and negative supply lines for smoothing the voltage output by the diode bridge 104. The FET 106 and the FET 107 are connected in series with one another between the positive and negative supply lines. A common node, to which a source terminal of the FET 106 and a drain terminal of the FET 107 are connected, is also connected to one end (power supply side) of the primary winding 116 of the transformer 115. The capacitor 108 for current resonance is connected to the other end of the primary winding 116 of the transformer 115 so that the primary winding 116 and the capacitor 108 are connected in series between the common node and the negative supply line. As power to drive the power supply control IC 110, a voltage acquired by rectifying and smoothing a voltage from an auxiliary winding 512 of a transformer 511 of the all-night power supply 501 by a rectifying and smoothing circuit is supplied. The rectifying and smoothing circuit includes the resistor 112, the diode 113, and the capacitor 114. An operation of the power supply for the power supply control IC 110 is controlled and stopped by the control unit 133.

With this configuration, when power is supplied to the power supply control IC 110, the power supply control IC outputs a control signal to the gate terminals of the FET 106 and the FET 107, thereby operating the FET 106 and the FET 107 alternately on and off. In other words, the FET 107 is turned off when the FET 106 is turned on, and the FET 106 is turned off when the FET 107 is turned on. Then, a voltage of the primary smoothing capacitor 105 is applied to the primary winding 116 of the transformer 115, thereby supplying an AC current to the primary winding 116.

Referring to FIGS. 6A to 6F and FIGS. 7A and 7B, a flow of an AC current in the primary wining 116 is described according to on or off states of the FET 106 and the FET 107.

Order 1: State Illustrated in FIG. 6A

Figure 6A:
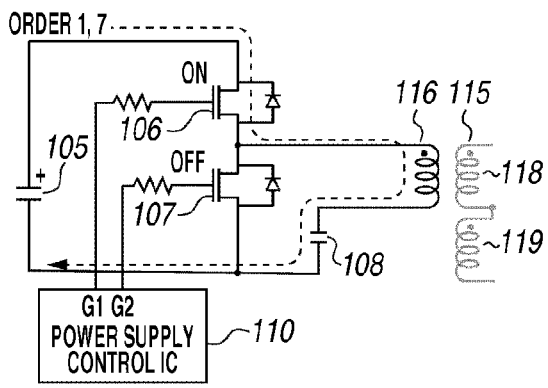
FIGS. 6A to 6F illustrate operations of a current resonance circuit in the current resonance power supply.

A state illustrated in FIG. 6A indicates an on-state of the FET 106 and an off-state of the FET 107. In this state, a current flows in a path of the primary smoothing capacitor 105→the FET 106→the primary winding 116 of the transformer 115→the capacitor 108 for current resonance→the primary smoothing capacitor 105.

Order 2: State Illustrated in FIG. 6B

Figure 6B:
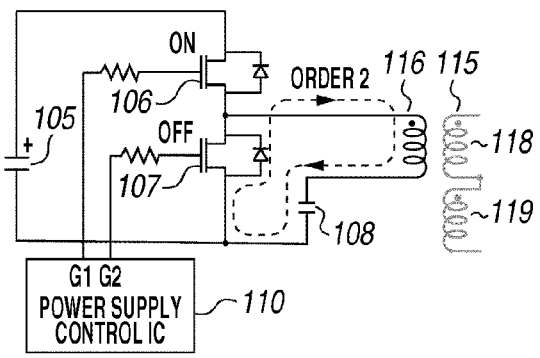

When the state illustrated in FIG. 6A is changed to that illustrated in FIG. 6B, the FET 106 is set in an off-state, and the FET 107 is set in an off-state. In this state, even when the FET 106 is changed from the on-state to the off-state, the power supply operates to maintain a current flowing through the primary winding 116 of the transformer 115. The current flows in a path of the primary winding 116 of the transformer 115→the capacitor 108 for current resonance→a parasitic diode 107a included in the FET 107.

Order 3: State Illustrated in FIG. 6C

Figure 6C:
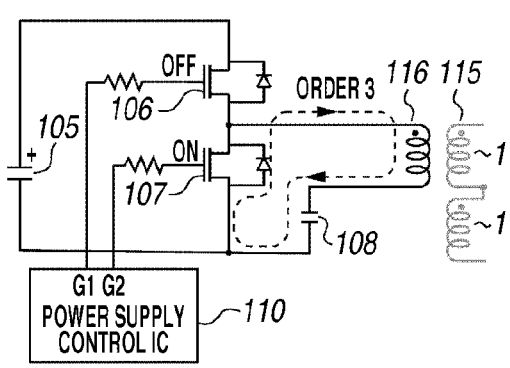

A state of FIG. 6C indicates an off-state of the FET 106 and an on-state of the FET 107. In this state, even when the FET 107 is set in the on-state while in the state of the order 2, the current continues to flow in the path of the primary winding 116 of the transformer 115→the capacitor 108 for current resonance→the parasitic diode 107a included in the FET 107.

Order 4: State Illustrated in FIG. 6D

Figure 6D:
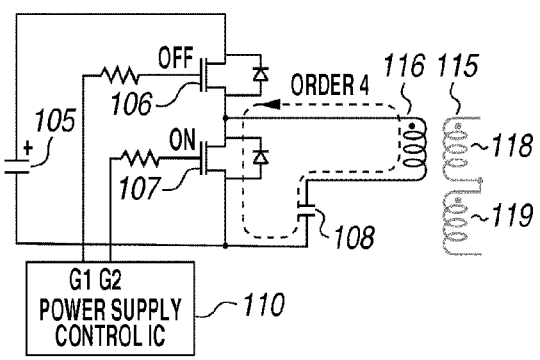

A state illustrated in FIG. 6D still continues the state illustrated in FIG. 6C, namely, the FET 106 is in the off-state, and the FET 107 is in the on-state. In this state, by a resonance operation of leakage inductance of the transformer 115 and the capacitor 108 for current resonance, the flow of the current gradually changes to a path of the capacitor 108 for current resonance→the primary winding 116 of the transformer 115→the FET 107.

Order 5: State Illustrated in FIG. 6E

Figure 6E:
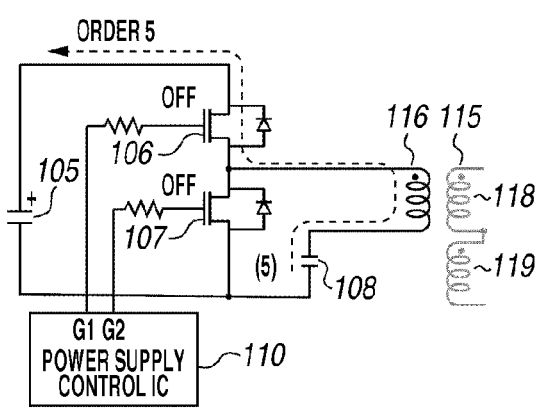

A state illustrated in FIG. 6E indicates an off-state of the FET 106 and an off-state of the FET 107. In this state, even when the FET 107 is turned off in the state of the order 3, the power supply operates to maintain the current flowing through the primary winding 116 of the transformer 115. The current flows in a path of the primary winding 116 of the transformer 115→a parasitic diode 106a included in the FET 106→the primary smoothing capacitor 105.

Order 6: State Illustrated in FIG. 6F

Figure 6F:
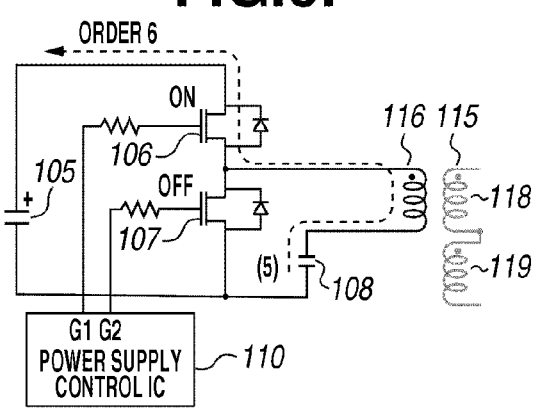

A state illustrated in FIG. 6F indicates an on-state of the FET 106 and an off-state of the FET 107. In this case, even when the FET 106 is turned on in the state of the order 5, the current continues to flow in the path of the primary winding 116 of the transformer 115→the parasitic diode 106a included in the FET 106→the primary smoothing capacitor 105.

Order 7: Again, State Illustrated in FIG. 6A

Again, the state illustrated in FIG. 6A is set, namely, the FET 106 is still in the on-state, and the FET 107 is in the off-state. In this state, by the resonance operation of the leakage inductance of the transformer 115 and the capacitor 108 for current resonance, the flow of the current gradually changes to the path of the primary smoothing capacitor 105→the FET 106→the primary winding 116 of the transformer 115→the capacitor 108 for current resonance→the primary smoothing capacitor 105.

The change of the on and off states of the FET 106 and the FET 107 and the flow of the current have been described.

Figure 7A:
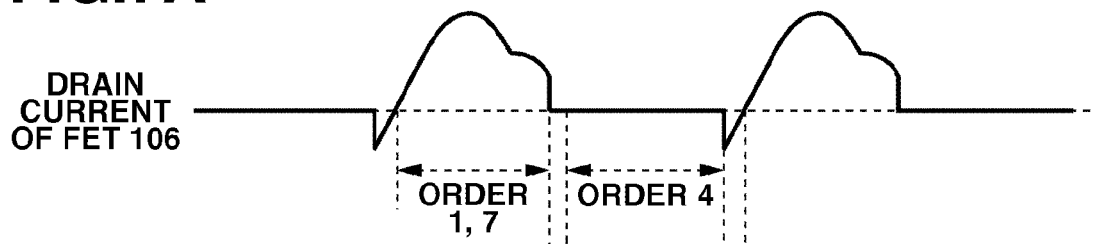
FIGS. 7A and 7B illustrate drain current waveforms of a FET in the current resonance power supply.
Figure 7B:
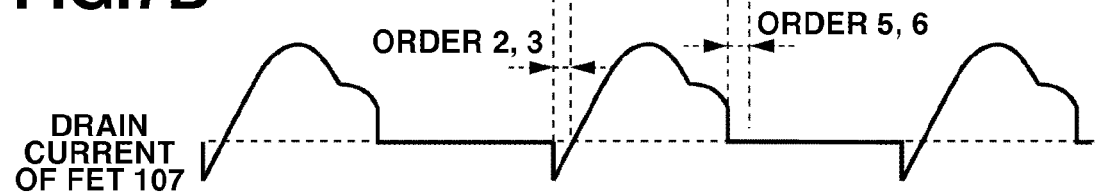
Figure 8A:
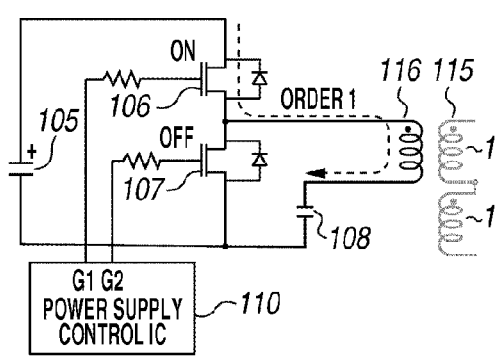
FIGS. 8A to 8D illustrate current resonance operations when a through-current flows in the current resonance power supply.
Figure 8B:
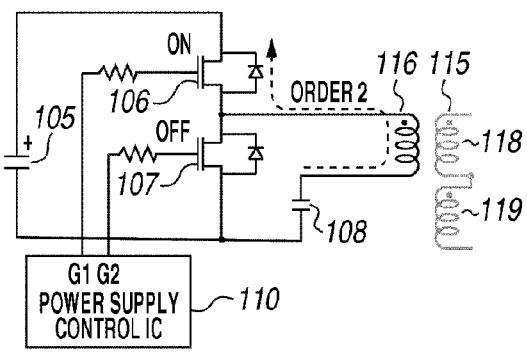
Figure 8C:
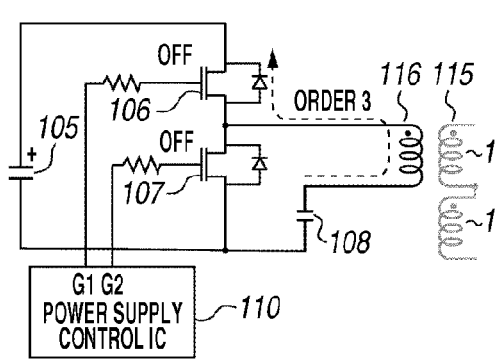
Figure 8D:
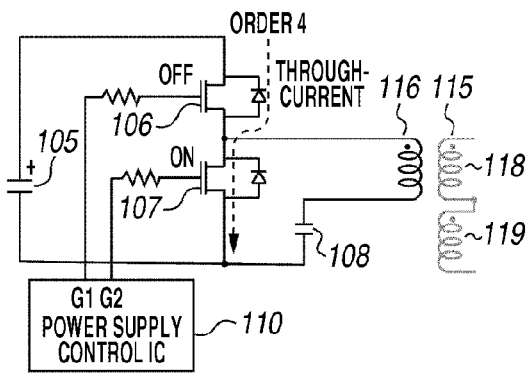

FIGS. 7A and 7B illustrate the operations described above referring to FIGS. 6A to 6F with drain current waveforms of the FET 106 and the FET 107. The current waveforms illustrated in FIGS. 7A and 7B indicate correspondence among the states (orders 1 to 7).

As illustrated in FIGS. 7A and 7B, an AC current flows in a direction reverse to a forward direction through the primary winding 116 of the transformer 115. An AC voltage is accordingly induced at the secondary windings 118 and 119 of the transformer 115. The AC voltage is rectified and smoothed by the rectifying and smoothing circuit including the two rectifying diodes 120 and 121 and the smoothing capacitor 122, and a DC power supply voltage is output from the voltage output unit 127.

The voltage from the voltage output unit 127 is divided by the regulation resistors 125 and 126, and the divided voltage is input to the shunt regulator 124. A feedback signal is then generated according to the input voltage, and fed back through the photocoupler 123 to a feedback (FB) terminal of the power supply control IC 110. The power supply control IC 110 controls switching timing (on/off timing and on/off timing) of both the FET 106 and the FET 107 based on the feedback signal, thereby enabling the voltage output unit 127 to output a stable DC voltage.

Next, an operation of the low-voltage detection circuit in the current resonance power supply is described. The current resonance power supply has a function of preventing an overcurrent by detecting that an AC voltage input from the commercial power supply is low.

The purposes of low-voltage detection are described again. The first purpose is to protect the circuit elements such as the FET 106, the FET 107, the transformer 115, and the capacitor 108 for current resonance from the overcurrent state. As the AC input voltage becomes lower, a current on the primary side of the transformer becomes higher because the power supply operates to maintain a constant output of the secondary side of the transformer. As a result, each circuit element of the primary side may exceed the rating (breakdown strength) to be set in an overcurrent state. Thus, to protect the circuit elements of the primary side from the overcurrent state, control is performed to stop the switching operation. The second purpose is to prevent flowing of a through-current to the FET 106 and the FET 107. Referring to FIGS. 8A to 8D and FIGS. 9A and 9B, an operation when the through-current flows to the FET 106 and the FET 107 is described.

Order 1: State Illustrated in FIG. 8A

In this state, a current flows in an arrow direction illustrated in the on-state of the FET 106. However, the AC input voltage is lower, and hence the on-period of the FET becomes longer than that during a normal operation. It is because as described above, when the AC input voltage is lower than the voltage during the normal operation as described above, the power supply control IC operates to maintain constant the output of the secondary side of the transformer, extending the on-period of the FET 106.

Order 2: State Illustrated in FIG. 8B

The longer on-period of the FET 106 causes a change of a resonance current in an arrow direction. Still, the FET 106 is in the on-state. The current in this case flows through the parasitic diode 106a included in the FET 106.

Order 3: State Illustrated in FIG. 8C

Even when the FET 106 is turned off, the current continues to flow through the parasitic diode included in the FET 106 in an arrow direction.

Order 4: State Illustrated in FIG. 8D

Simultaneously when the FET 107 is turned on, the parasitic diode 106a included in the FET 106 starts reverse recovery. However, a through-current flows in an arrow direction due to a current of a reverse direction during the reverse recovery.

As described above, when the AC input voltage is lower than the voltage during the normal operation, a through-current may flow.

Figure 9A:
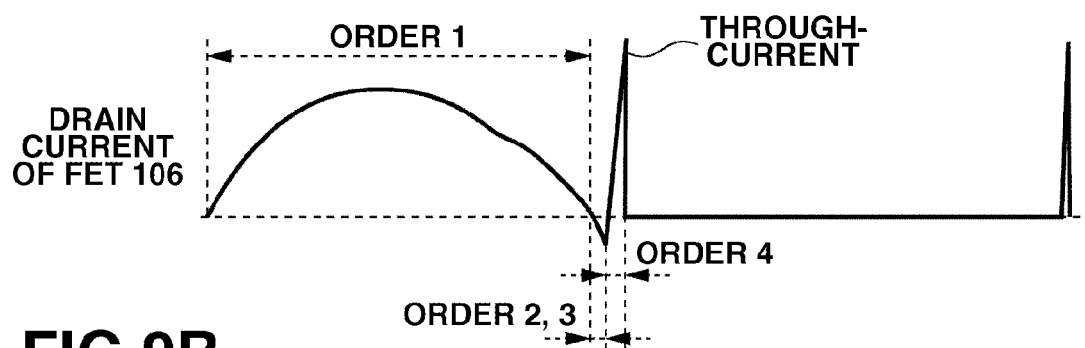
FIGS. 9A and 9B schematically illustrate drain currents of the FET when the through-current flows.
Figure 9B:
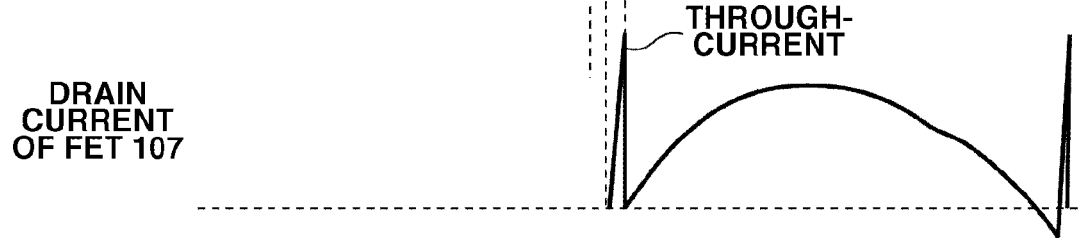

FIGS. 9A and 9B illustrate states when the through-current flows with drain current waveforms of the FET 106 and the FET 107. As illustrated in FIGS. 9A and 9B, when the AC input voltage is low, the FET 106 and the FET 107 are switched on, thereby causing flowing of a through-current.

As described above, to achieve the two purposes, namely, 1: prevention of destruction of the circuit elements caused by the overcurrent state, and 2: prevention of flowing of the through-current to the FET, the low-voltage detection circuit for detecting whether the AC input voltage is low must be installed.

In the present exemplary embodiment, low-voltage detection of the AC input voltage is performed by detecting a voltage between a drain and a source of the FET 107. Detecting the voltage between the drain and the source of the FET 107 prevents consumption of power by the detection circuit as long as the FET 106 and the FET 107 are not performing switching operations. The present embodiment utilizes this feature to achieve a power saving greater than that by the conventional current resonance power supply.

A voltage input to a VSEN terminal of the power supply control IC 110 to detect the AC input voltage is a voltage between the drain and the source of the FET 107. In the present exemplary embodiment, the voltage between the drain and the source of the FET 107 is acquired by rectifying, smoothing and dividing the voltage by means of a voltage detection circuit including the diode 201, the resistor 202, the resistor 203, and the capacitor 204. The resulting voltage is input to the VSEN terminal. A voltage waveform between the drain and the source of the FET 107 during the normal operation is a rectangular wave having as its peak voltage the positive supply line potential (the potential of a +terminal voltage of the primary smoothing capacitor 105) and whose cycle is the same as a switching cycle of the FET 107.

A voltage Vacr generated across the resistor 203 is approximately calculated by the following expression (1):

$$Vacr=((R203/(R203+R202))\times Vdch \times \text{on\_DUTY})/(\text{on\_DUTY}+R/R203\times\text{off\_DUTY}). \tag{1}$$

R203: resistance value of resistor 203
R202: resistance value of resistor 202
R: parallel combined resistance of resistor 202 and resistor 203 [R=R202×R203/(R202+R203)]
Vdch: +terminal voltage of primary smoothing capacitor 105
on_DUTY: DUTY ratio when FET 107 is in an on-state off_DUTY: DUTY ratio when FET 107 is in an off-state (however, these are values in a case where forward-direction voltage of diode 201 is ignored)

The expression (1) is described.

When the diode 201 is not present, in other words, when the circuit includes only the resistors 202 and 203, the voltage Vacr is calculated by the following expression (2):

$$Vacr = ((R203/(R202+R203)) \times Vdch \times \text{on\_DUTY})/(\text{on\_DUTY}+\text{off\_DUTY}) \quad (2)$$

Conversely, when the diode 201 is present, in the off-state of the FET 107, a potential discharged from the capacitor 204 is reduced by R/R203 (parallel combined resistance of resistor 202 and resistor 203 divided by the resistance value of resistor 203). The expression (2) is accordingly changed to the expression (1) by multiplying off_DUTY of the expression (2) by R/R203. In this case, because of Vdch∝AC input voltage, a relationship of Vacr∝AC input voltage is established.

In other words, Vacr can be used as a measure of the AC input voltage. When the AC input voltage drops, the detected voltage Vacr also drops. The values of the resistor 202, the resistor 203, and the capacitor 204 are determined so that when the AC input voltage drops to a low state, a predetermined low voltage is detected at the VSEN terminal of the power supply control IC 110.

A threshold value (lower limit value) of the AC input voltage for detecting the low voltage state can be set to a limit AC voltage value that can prevent, when the low-voltage detection circuit operates, an overcurrent state exceeding a rating of each circuit element of the primary side, and a through-current of the FET 106 and the FET 107. According to the present exemplary embodiment, an operation of the power supply control IC when the low voltage is detected is as follows.

(Low-voltage detection, operation after detection, and effects provided by the present exemplary embodiment) When the AC input power supply voltage drops to lower a voltage of the primary smoothing capacitor 105, a voltage of the VSEN terminal of the power supply control IC 110 drops. When the voltage drops below the set threshold voltage, the power supply control IC 110 stops switching operations of the FET 106 and the FET 107. When the switching operations of the FETs are stopped, an overcurrent state exceeding the rating of the primary side circuit element described above, and flowing of a through-current via the FET 106 and the FET 107, can be prevented.

The conventional low-voltage detection circuit can also prevent, by detecting a low voltage, destruction of the elements and flowing of a through-current caused by an overcurrent. However, in the conventional circuit, a voltage divider resistor for detecting the low voltage uses the +terminal of the primary smoothing capacitor 105 as a voltage source. The conventional circuit also does not stop the switching operations upon detecting a low voltage state. On the other hand, according to the present exemplary embodiment, the switching operations of the FETs 106 and 107 are stopped when the low voltage state is detected and accordingly the circuit for detecting the low voltage consumes no power when the switching operations are stopped. In the normal operation state, switching operations are performed but, because the drain-source voltage of the FET 107 is used as the voltage source of the voltage detection circuit, less power is consumed than if the potential of the +terminal of the primary smoothing capacitor 105 is used, as in the conventional circuit. Hence power consumption can be reduced in both of a normal operation state and a stop state. As a result, power saving of the current resonance power supply can be achieved.

Figure 2:
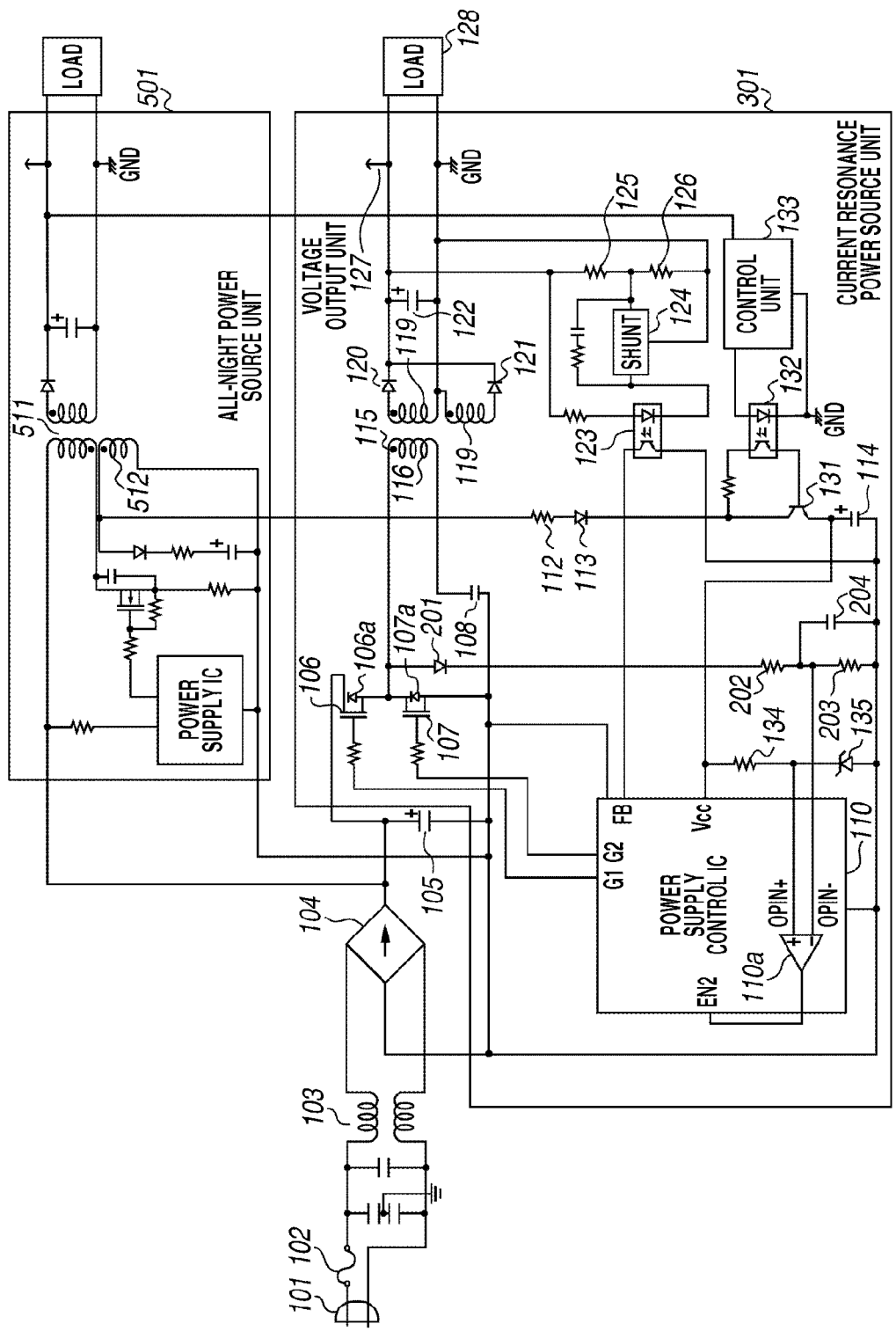
FIG. 2 is a circuit diagram illustrating a current resonance power supply according to a second exemplary embodiment.

Next, a second exemplary embodiment is described. FIG. 2 is a circuit diagram illustrating a current resonance power supply according to the present exemplary embodiment. A difference from the first exemplary embodiment is use of an IC including an operational amplifier 110a as a power supply control IC 110. A circuit according to the present exemplary embodiment is different from that of the first exemplary embodiment in that a resistor 134 and a zener diode 135 are included, in addition to the change of the power supply control IC.

Except for the power supply control IC, and the addition of the resistor and the zener diode, the circuit is similar to the circuit of the first exemplary embodiment. As in the case of the first exemplary embodiment, a low voltage state of an AC input voltage is detected by detecting a voltage between a drain and a source of a FET 107.

In the circuit illustrated in FIG. 2, a low-voltage detection circuit is configured by using the operational amplifier 110a included in the power supply control IC 110. The operational amplifier 110a functions as a comparison unit for comparing the voltage between the drain and the source of the FET 107 with a reference voltage. The reference voltage generated by the resistor 134 and the zener diode 135 is input to an OPIN+ terminal of the operational amplifier 110a. A voltage Vacr acquired by rectifying, smoothing and dividing the voltage between the drain and the source of the FET 107 by means of a diode 201, a resistor 202, a resistor 203, and a capacitor 204 as in the case of the first exemplary embodiment is input to an OPIN− terminal of the operational amplifier 110a. Values of the resistor 134, the zener diode 135, the resistor 202, and the resistor 203 are set so that a relationship of OPIN+ terminal voltage <OPIN− terminal voltage exists during a normal operation and a relationship of OPIN+ terminal voltage >OPIN− terminal voltage exists during low voltage detection (when the AC input voltage is in the low-voltage state).

A threshold value (lower limit value) of the AC input voltage for detecting the low voltage can be set to an AC voltage value that can prevent an overcurrent state exceeding a rating of each circuit element of a primary side and flowing of a through-current of the FET 106 and the FET 107. For example, the threshold value can be set based on breakdown strengths of the FET 106 and the FET 107.

With this configuration, during low voltage detection, a HI signal is output from an OPOUT terminal of the power supply control IC 110. After the HI signal has been input to an EN 2 terminal of the power supply control IC 110, the power supply control IC 110 forcibly applies high switching frequencies to the FET 106 and the FET 107. The high switching frequencies of the FET 106 and the FET 107 leads to a reduction of a resonance current flowing to the circuit elements of the primary side including the FET 106, the FET 107, a transformer 115, and a capacitor 108 for current resonance. Thus, while an output voltage of a voltage output unit 127 of a secondary side of the transformer is lower than a target voltage, the above-mentioned troublesome overcurrent state exceeding the rating of each of the circuit elements of the primary side of the transformer can be prevented.

As described above in the first exemplary embodiment, when the AC input voltage has the low-voltage state, switching operations of the FETs 106 and 107 are stopped, which prevents a through-current flowing as can otherwise occur as illustrated in FIGS. 8A to 8D. In the second exemplary embodiment, by applying high switching frequencies, flowing of a through-current can also be prevented. This is possible because, when the switching frequencies of the FET 106 and FET 107 are high, a state is not similar to the operation of the first exemplary embodiment illustrated in FIGS. 8A to 8D but similar to the normal operation of the first exemplary embodiment illustrated in FIGS. 6A to 6F. FIGS. 10A and 10B illustrate drain current waveforms of the FET 106 and the FET 107 when oscillation frequencies are high.

As illustrated in FIGS. 10A and 10B, by setting high oscillation frequencies, while a voltage from the voltage output from the voltage output unit 127 is lower than that during the normal operation, an overcurrent state exceeding the ratings of the circuit elements of the transformer and flowing of a through-current can be prevented.

As described above, as in the case of the first exemplary embodiment, according to the present exemplary embodiment, since the circuit for detecting the low voltage consumes no power when the power supply does not operate, power consumption can be reduced in the stop state. Also, because the drain-source voltage of the FET 107 is used as a voltage source for the voltage detection circuit, rather than the potential of the +terminal of the primary smoothing capacitor 105, less power is consumed in the normal operation state, too. As a result, power saving can be achieved for the current resonance power supply.

Figure 3:
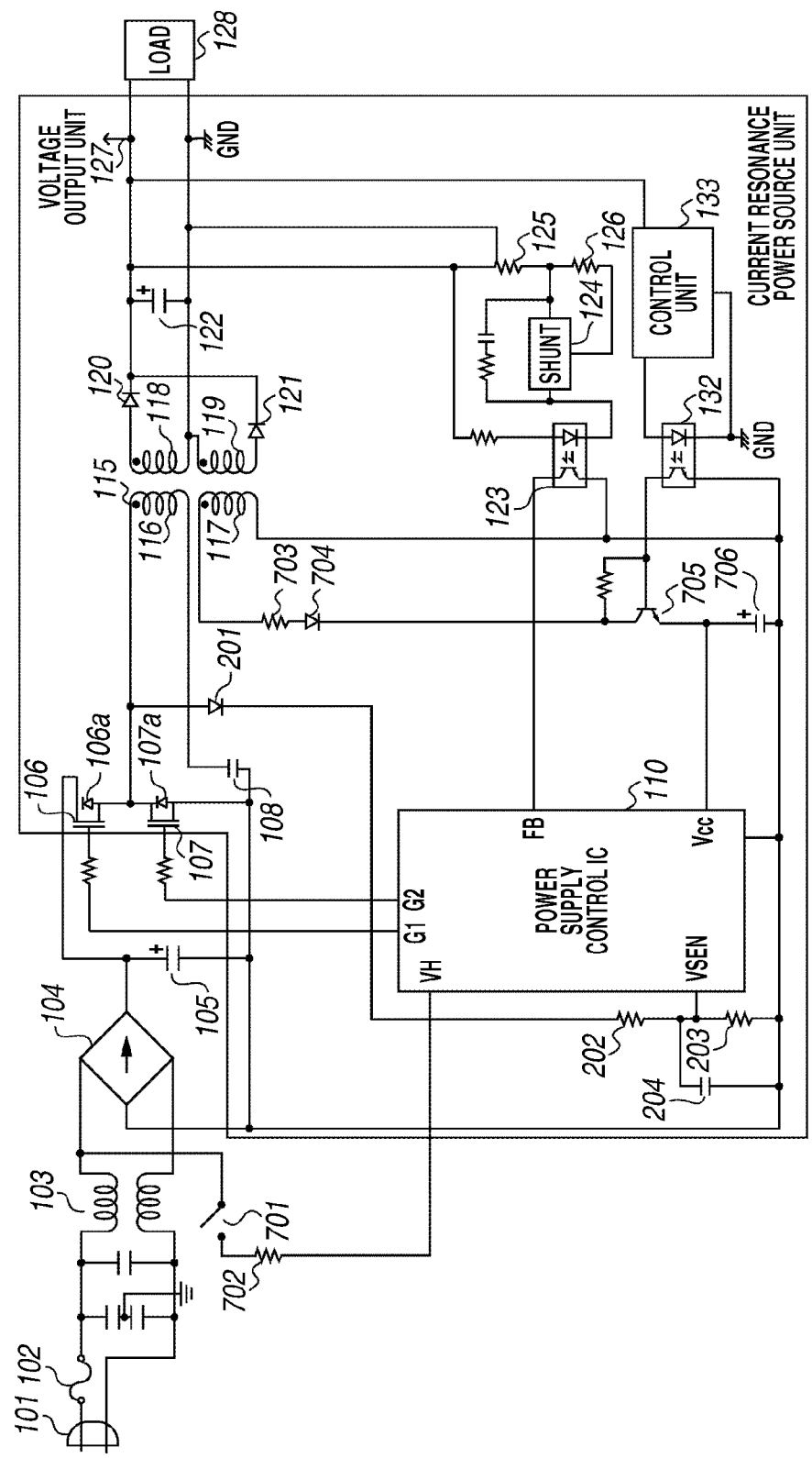
FIG. 3 is a circuit diagram illustrating a current resonance power supply according to a third exemplary embodiment.

Next, a third exemplary embodiment is described. FIG. 3 is a circuit diagram illustrating a current resonance power supply according to the present exemplary embodiment. The first exemplary embodiment and the second exemplary embodiment each have two converters, namely the all-night power supply and the current resonance power supply. Unlike the first and second exemplary embodiments, the present exemplary embodiment has only one converter. According to the present exemplary embodiment, a low-voltage detection circuit is installed as in the case of the first exemplary embodiment, and power saving is achieved when a power switch is off. The current resonance power supply illustrated in FIG. 3 includes the following circuit components (elements): an auxiliary winding 117 of a transformer 115, a power switch 701, a starting resistor 702, a resistor 703, a diode 704, a transistor 705, and a capacitor 706.

The power supply illustrated in FIG. 3 is activated when the power switch 701 is turned on to supply starting power to a VH terminal of a power supply control IC 110 via the starting resistor 702. After the power supply has been activated, power is supplied from the auxiliary winding 117. When the power switch 701 is turned off, turning-off of the power switch is detected. The arrangement for detecting the turning off of the power switch is omitted but suitable arrangements will be known to those skilled in the art. A control unit 133 detects the off-state of the power switch 701. The control unit 133 detects the off-state of the power switch, operates a photocoupler 132 to turn off the transistor 705, and stops supplying the power to the power supply control IC no, thereby stopping the power supply.

In such a power supply, even when the power switch is suddenly turned off, the control unit 133 can determine to stop the power supply. Thus, in an electronic device that includes the power supply, as an advantage, the power supply can be stopped after various processes are executed. In such a power supply, by suppressing power consumption in the off-state of the power switch, power saving can be achieved for the power supply and an apparatus that includes the power supply.

In the power supply illustrated in FIG. 3, while the power switch is off, because of an off-state of a FET 106, a low-voltage detection circuit consumes no power as in the case of the first exemplary embodiment. While the power supply operates, as in the case of the first exemplary embodiment, a low voltage can be detected by utilizing a voltage between a drain and a source of a FET 107.

In the power supply having one converter according to the present exemplary embodiment, as in the case of the first exemplary embodiment, the circuit for detecting the low voltage consumes no power when the power supply does not operate, and hence power consumption for low-voltage detection can be reduced both in the normal operation state and the stop state. As a result, power saving can be achieved for the current resonance power supply.

Figure 4:
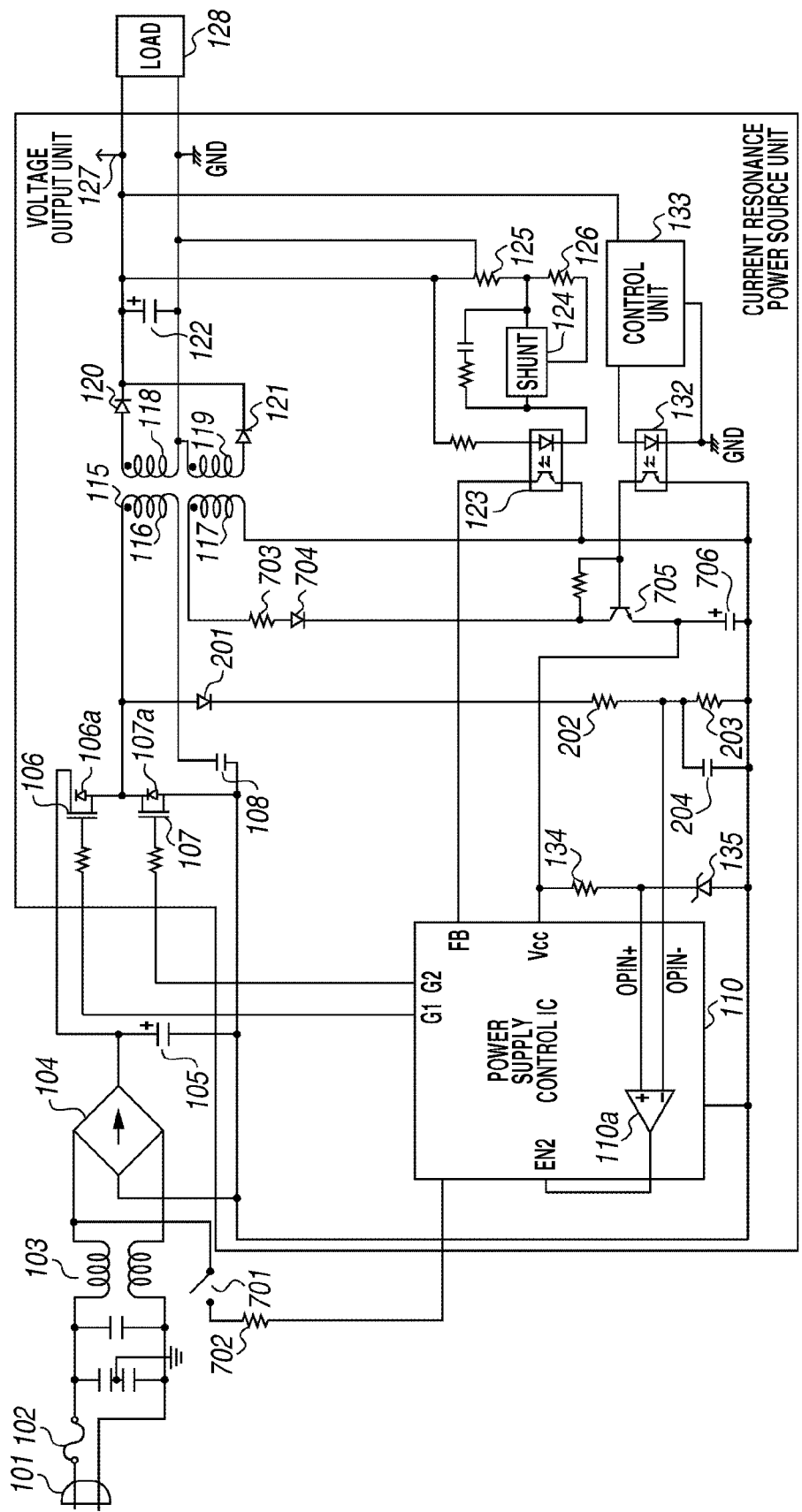
FIG. 4 is a circuit diagram illustrating a current resonance power supply according to a variant of the third exemplary embodiment.

FIG. 4 is a circuit diagram illustrating another current resonance power supply according to a variant of the third exemplary embodiment. In the circuit illustrated in FIG. 4, the power supply control IC 110 in the circuit illustrated in FIG. 3 has been changed to the power supply control IC including the operational amplifier 110a according to the second exemplary embodiment. Operations of the low-voltage detection circuit and the power supply control IC 110 during low-voltage detection are similar to those of the third exemplary embodiment. A configuration of the low-voltage detection circuit is similar to those of the exemplary embodiments described above. In the power supply illustrated in FIG. 4, as in the case of the first exemplary embodiment, the circuit for detecting the low voltage consumes no power, and hence power consumption for low-voltage detection can be reduced both in the normal operation state and the stop state. As a result, power saving can be achieved for the current resonance power supply.

Figure 5:
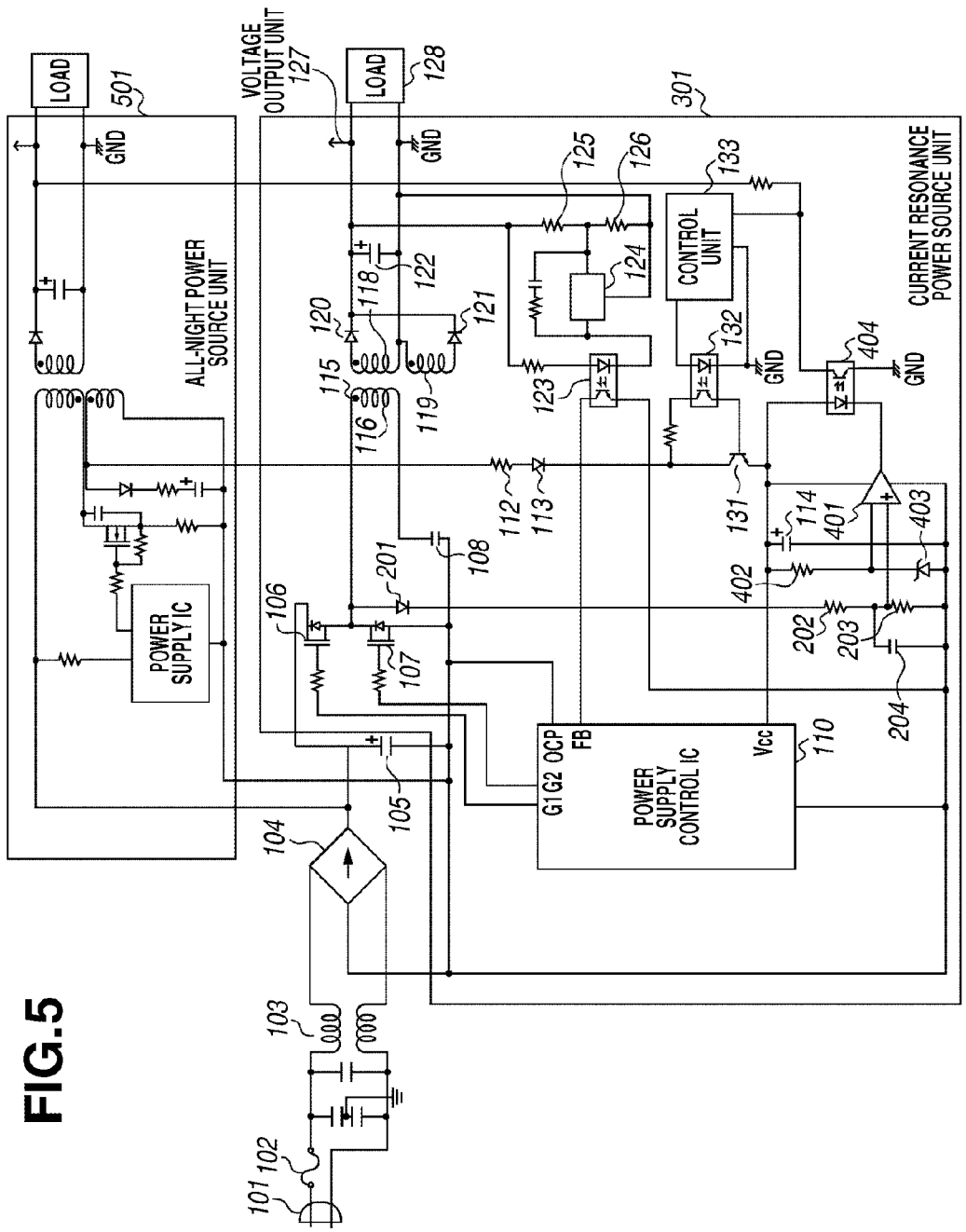
FIG. 5 is a circuit diagram illustrating a current resonance power supply according to a fourth exemplary embodiment.

Next, a fourth exemplary embodiment is described. FIG. 5 is a circuit diagram illustrating a current resonance power supply according to the present exemplary embodiment. According to the exemplary embodiment, when a low-voltage detection circuit detects a low voltage, power supply to a power supply control IC is stopped. Newly installed components in addition to those of the first exemplary embodiment are a comparator 401, a resistor 402, a zener diode 403, and a photocoupler 404. A power supply operation during a normal operation is similar to that of the first exemplary embodiment.

In FIG. 5, a portion different from that of the first exemplary embodiment is a configuration of the low-voltage detection circuit. According to the present exemplary embodiment, a reference voltage is generated by a resistor 402 and a zener diode 403, and input to a +terminal of the comparator 401. A voltage Vacr acquired by rectifying, smoothing and dividing a voltage between a drain and a source of a FET 107 in a voltage detection circuit (diode 201, a resistor 202, a resistor 203, and a capacitor 204) as in the case of the first exemplary embodiment is input to a −terminal of the comparator 401.

Values of the resistor 402, the zener diode 403, the resistor 202, and the resistor 203 are set so that a relationship of +terminal voltage of comparator 401<−terminal voltage of comparator 401 exists during a normal operation and a relationship of +terminal voltage of comparator 401>−terminal voltage of the comparator 401 exists during the low voltage state.

When the low-voltage detection circuit detects a low voltage, an HI signal is input to a control unit 133 via a photocoupler 404. The control unit 133 to which the HI signal has been input turns off a transistor 131 via a photocoupler 132 to stop supplying power to the power supply control IC. Switching operations of a FET 106 and a FET 107 can accordingly be stopped to prevent an overcurrent. A through-current flowing through the FET 106 and the FET 107 can be prevented. According to the present exemplary embodiment, as in the case of the first exemplary embodiment, the circuit for detecting the low voltage consumes no power in the stop state, and because the drain-source voltage of the FET 107 is used as a voltage source for the voltage detection circuit, less power is consumed in the normal operation state. Hence power consumption for low-voltage detection can be reduced both in the normal operation state and the stop state. As a result, power saving can be achieved for the current resonance power supply.

The current resonance power supply according to each of the first to fourth exemplary embodiments can be applied as a low-voltage power supply in an image forming apparatus such as a laser beam printer, a copying machine, or a facsimile machine. The current resonance power supply can be used to supply power to a controller that is a control unit in the image forming apparatus and to supply power to a motor that is a drive unit of a feeding roller for conveying sheets.

Figure 11A:
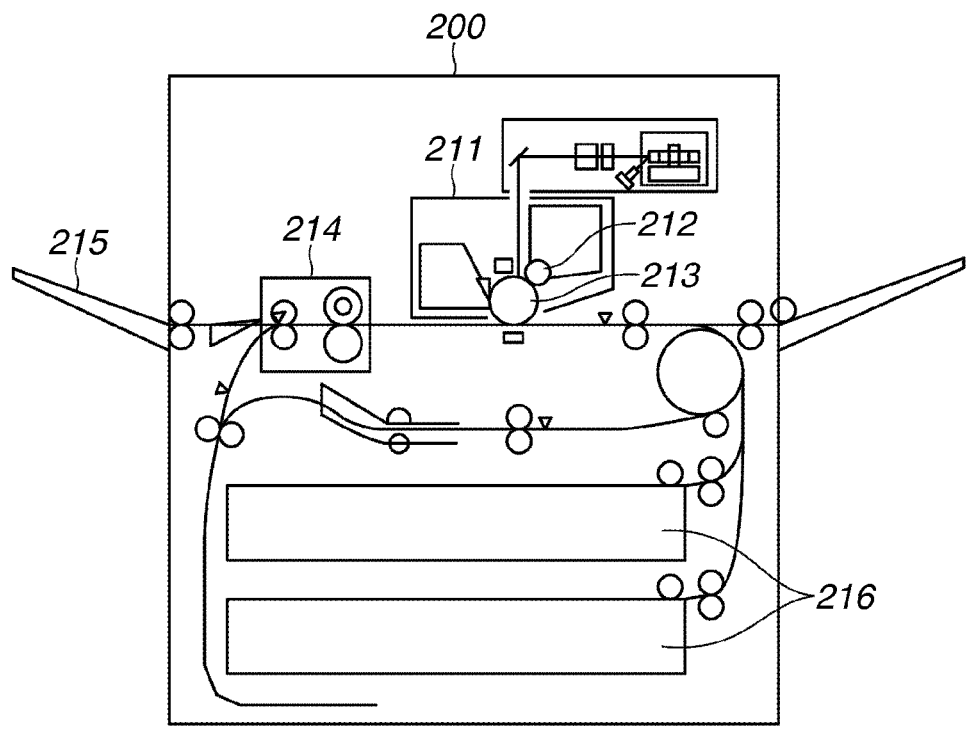
FIGS. 11A and 11B schematically illustrate an image forming apparatus to which the current resonance power supply of the present invention can be applied.
Figure 11B:
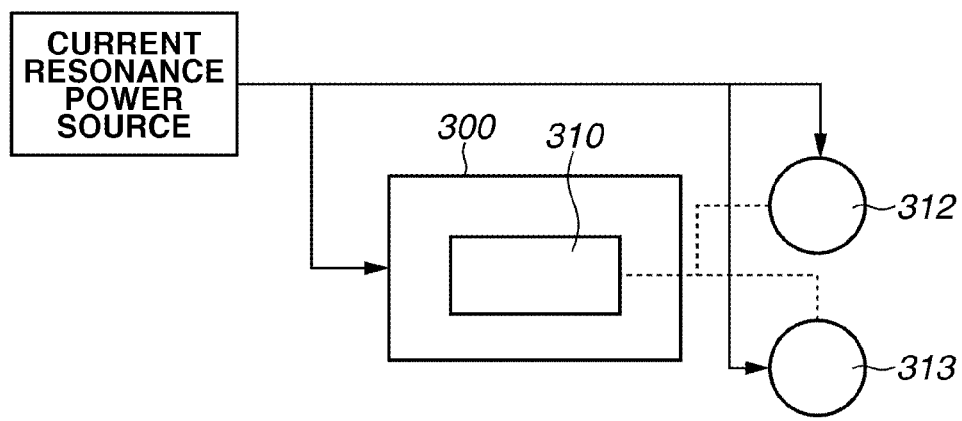

FIG. 11A illustrates a schematic configuration of a laser beam printer that is an example of an image forming apparatus. The laser beam printer 200 includes a photosensitive drum 211 that is an image carrier as an image forming unit 210, on which a latent image is formed, and a development unit 212 for developing the latent image formed on the photosensitive drum by toner. The toner image developed on the photosensitive drum 211 is transferred to a sheet (not illustrated) as a recoding medium fed from a cassette 216. The toner image transferred to the sheet is fixed by a fixing device 214 to be discharged to a tray 215. FIG. 11B illustrates power supply lines from the power supply to the controller that is the control unit of the image forming apparatus and the motor that is the drive unit. The current resonance power supply can be applied as a low-voltage power supply for supplying power to the controller 300 that includes a central processing unit (CPU) 310 for controlling an image forming operation, and for supplying power to the motors 312 and 313 as drive units for forming images. As power to be supplied, a voltage of 3.3V is supplied to the controller 300, and a voltage of 24V is supplied to the motors. For example, the motor 312 drives the feeding roller for conveying sheets, and the motor 313 drives the fixing device 214.

The current resonance power supply according to each of the exemplary embodiments is not limited to being used in an image forming apparatus, and can be used as a low-voltage power supply in other electronic devices.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-125239 filed May 31, 2010, which is hereby incorporated by reference herein in its entirety.

What is claimed is:

1. A current resonance power supply comprising:
a transformer having a primary winding and a secondary winding;
two switching elements connected to one end of the primary winding of the transformer and arranged in series;
a resonance capacitor connected to the other end of the primary winding; and
a voltage detection unit connected between the one end of the primary winding and the two switching elements and configured to detect that AC voltage input to a primary side of the transformer becomes lower,
wherein operations of the switching elements are controlled based on a detection result of the voltage detection unit.

2. The current resonance power supply according to claim 1, wherein the operations of the two switching elements are stopped based on a voltage detected by the voltage detection unit.

3. The current resonance power supply according to claim 1, further comprising a comparison unit configured to compare a voltage detected by the voltage detection unit with a reference voltage,
wherein the operations of the two switching elements are controlled based on an output from the comparison unit.

4. The current resonance power supply according to claim 3, further comprising a control unit configured to control the operations of the two switching elements,
wherein the control unit includes the comparison unit.

5. The current resonance power supply according to claim 1, wherein the voltage detection unit includes a diode, a capacitor, and a resistor connected between the one end of the primary winding and the two switching elements.

6. An image forming apparatus, comprising:
an image forming unit configured to form an image on an image carrier;
a control unit configured to control an image forming operation of the image forming unit; and
a power supply configured to supply power to the image forming unit or the control unit,
wherein the power supply is a current resonance power supply for resonating, including:
a transformer having a primary winding and a secondary winding;
two switching elements connected to one end of the primary winding of the transformer and arranged in series;
a resonance capacitor connected to the other end of the primary winding; and
a voltage detection unit connected between the one end of the primary winding and the two switching elements and configured to detect that AC voltage input to a primary side of the transformer becomes lower, and operations of the two switching elements are controlled based on a detection result of the voltage detection unit.

7. The image forming apparatus according to claim 6, wherein the operations of the two switching elements are stopped based on a voltage detected by the voltage detection unit.

8. The image forming apparatus according to claim 6, further comprising a comparison unit configured to compare a voltage detected by the voltage detection unit with a reference voltage,
wherein the operations of the two switching elements are controlled based on an output from the comparison unit.

9. The image forming apparatus according to claim 8, further comprising a control unit configured to control the operations of two the switching elements,
wherein the control unit includes the comparison unit.

10. The image forming apparatus according to claim 6, wherein the voltage detection unit includes a diode, a capacitor, and a resistor connected between the one end of the primary winding and the two switching elements.

11. A power supply comprising:
a transformer;
a switching unit connected to a primary side of the transformer, the switching unit including two switching elements arranged in series; and
a voltage detection element connected between the two switching elements of the switch unit,
wherein a switching operation of the switching unit is controlled based on a signal obtained via the voltage detection element.

12. The power supply according to claim 11, wherein the operation of the switching unit is stopped based on the signal obtained via the voltage detection element in a case where a voltage to be input to the primary side of the transformer is decreased.

13. The power supply according to claim 11, further comprising:
a resonance capacitor disposed on the primary side of the transformer,
wherein a current flows in the resonance capacitor in response to switching of the switching unit.

14. The power supply according to claim 11,
wherein the voltage detection element includes a diode, a resistor and a capacitor, and
wherein a current flows in the voltage detection element in response to switching of the switching unit.

15. An image forming apparatus comprising:
an image forming unit configured to form an image; and
a power supply configured to supply power for operating the image forming unit, the power supply including:
a transformer;
a switching unit connected to a primary side of the transformer, the switching unit including two switching elements arranged in series; and
a voltage detection element connected between the two switching elements of the switch unit,
wherein a switching operation of the switching unit is controlled based on a signal obtained via the voltage detection element.

16. The image forming apparatus according to claim 15, wherein the operation of the switching unit is stopped based on the signal obtained via the voltage detection element in a case where a voltage to be input to the primary side of the transformer is decreased.

17. The image forming according to claim 15, further comprising:
a resonance capacitor disposed on the primary side of the transformer,
wherein a current flows in the resonance capacitor in response to switching of the switching unit.

18. The image forming apparatus according to claim 15,
wherein the voltage detection element includes a diode, a resistor and a capacitor, and
wherein a current flows in the voltage detection element in response to switching of the switching unit.

19. The image forming apparatus according to claim 15, further comprising:
a control unit configured to control an operation of the image forming unit,
wherein the power supply is configured to supply power to the control unit.

* * * * *